US006827325B2

(12) United States Patent
Hofmann et al.

(10) Patent No.: US 6,827,325 B2
(45) Date of Patent: Dec. 7, 2004

(54) SHAPE MEMORY POLYMER OR ALLOY OPHTHALMIC LENS MOLD AND METHODS OF FORMING OPHTHALMIC PRODUCTS

(75) Inventors: Gregory J. Hofmann, Jacksonville, FL (US); Kenneth W. Foley, Fruit Cove, FL (US); Thomas R. Rooney, Jacksonville, FL (US); Patrick J. Hood, Bellbrook, OH (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 31 days.

(21) Appl. No.: 10/056,773

(22) Filed: Jan. 24, 2002

(65) Prior Publication Data

US 2004/0015261 A1 Jan. 22, 2004

Related U.S. Application Data

(63) Continuation-in-part of application No. 09/649,635, filed on Aug. 28, 2000.
(60) Provisional application No. 60/263,986, filed on Jan. 24, 2001.

(51) Int. Cl.[7] .............................................. B29D 11/00
(52) U.S. Cl. ..................... 249/134; 425/808; 264/2.5
(58) Field of Search ................................ 249/134, 160; 425/808; 264/2.5, 230, 337; 526/280–283, 257, 336, 347

(56) References Cited

U.S. PATENT DOCUMENTS

| 4,831,094 | A | * | 5/1989 | Stein et al. ................. 526/283 |
| 5,189,110 | A | | 2/1993 | Ikematu et al. |
| 5,506,300 | A | | 4/1996 | Ward et al. |
| 5,814,705 | A | | 9/1998 | Ward et al. |
| 6,160,084 | A | | 12/2000 | Langer et al. |

FOREIGN PATENT DOCUMENTS

| JP | 6317995 | | 7/1988 |
| JP | 02-018005 | * | 1/1990 |
| JP | 02-108433 | * | 4/1990 |
| WO | WO 99/46327 A1 | | 9/1999 |

OTHER PUBLICATIONS

USSN 10/056,590 entitled "Shape Memory Styrene Copolymer", Tat H. Tong., filed Jan. 24, 2002.
Arthur Lendlein et al., "AB–Polymer networks Based on Oligo(caprolactone) Segmenets Showing Shape–Memory Properties", PNAS, Jan. 30, 2001, 842–847, vol. 98, No. 3.
Fengkui Li et al., "Studies of Thermally Stimulated Shape Memory Effect of Segmented Polyurethanes", J. Appl. Poly,. Sci., 1997, 1511–1516, 64, John Wiley & Sons.
J. R. Lin et al.. "Study of Shape–Memory Behavior of Polyether–Based Polyurethanes; Influence on Hard–Segment Conetent", J. Appl. Polym Sci., 1998, 1563–1574, 69, John Wiley & Sons.
Fenkui Li et al., "Shape Memory Effect of Ethylene–Vinyl Acetate Copolymers", J. Appl. Sci., 1999, 1063–1070, 71, John Wiley & Sons.
Yoshiaru Kagami et al.,, "Shape Memort behaviors of Crosslinked Copolymers Containing Stearyl Acrylate", Macomol. Rapid Commun., 1996, 539–543, 17, Huthig & Wepf Verlag Zug.

(List continued on next page.)

*Primary Examiner*—James P. Mackey
*Assistant Examiner*—Donald Heckenberg

(57) ABSTRACT

A shape memory polymer contact lens mold is formed from a sheet of a shape memory polymer in a press, an agile tool or by an agile tool formed by an inert gas at a temperature at or above the glass transition temperature which is thereupon cooled to below the glass transition temperature and removed therefrom.

32 Claims, 10 Drawing Sheets

OTHER PUBLICATIONS

H. Tubushi et al., "Deformation Properties of Polyurethane Shape Memory Polymers", Proceedings of the First International Conference on Shape Memeory and Superelastic Technologies, 1994, 109–114.

Richard F. Gordon, "Applications of Shape memory Polyurethanes", Proceedings of the First International Conference on Shape Memory and Superelastic Technologies, 1994, 115–120.

Han Mo Yeong et al., "Shape Memory Polyurethane Containing Amorphous Reversible Phase", J. Mat. Sci., 2000, 1579–1583, 35, Kluwer Academic Publishers.

Han Mo Yeong et al., "Temperature Sensitive Water Vapour Permeability and Shape Memory Effect of Polyurethane With Crystalline Reversible Phase and Hydrophilic Segments", Polym. In., 2000, 1714–1721, 49.

J. R. Lin et al., "Shape Memory Crosslinked Ester–Type Polyurethane and Its Mechanical Viscoelastic Model", J. Appl. Poly. Sci., 1999, 1305–1319, 73, John Wiley & Sons.

* cited by examiner

SHAPE MEMORY POLYMER OR ALLOY OPHTHALMIC LENS MOLD AND METHODS OF FORMING OPHTHALMIC PRODUCTS

CROSS-REFERENCE TO RELATED APPLICATION

This is a continuation-in-part of U.S. Ser. No. 09/649,635 filed Aug. 28, 2000 entitled, "Deformable Molds And Methods For Their Use In The Manufacture Of Ophthalmic Lenses", and this application claims priority from provisional application Ser. No. 60/263,986, filed Jan. 24, 2001, both applications are incorporated herein by reference.

FIELD OF THE INVENTION

The present invention relates to the manufacture of ophthalmic products. In particular, the invention provides molds for forming ophthalmic products, and methods for forming the molds and ophthalmic products using the molds.

BACKGROUND OF THE INVENTION

The use of ophthalmic lenses, including spectacle lenses, contact lenses, intraocular lenses, and the like for the correction of ametropia is well known. Production of the lenses requires the use of molds that impart the desired corrective characteristics onto the lens surfaces. Typically, a large inventory of molds is required corresponding to each sphere, add, and cylinder power, and combinations thereof desired for the finished lens. Production and maintenance costs for the mold inventory are high.

One current method of forming contact lenses is actually by a process that has two molding steps. In the first molding step, male and female metal inserts, fabricated by such methods as diamond point turning to ensure a very smooth surface, are used to injection mold an ophthalmic lens mold comprising a pair of mold members, typically male and female plastic molds, also referred to as back curve and front curve lens molds. Then, in the second molding step, the contact lens forming material is dosed between the back curve and front curve lens molds and the contact lens is molded between the plastic back and front curve. Typically the back and front curves are not reused. The production of an ophthalmic lens mold typically comprising mold members in which a lens forming material is molded to form an ophthalmic product, is the subject of the present invention.

The injection molding step just described to form the ophthalmic lens mold members limits the types of materials that can be used to form the lens molds.

One method for production of lenses that attempts to eliminate the need for large inventory molds is disclosed in U.S. Pat. No. 6,026,204. In this patent is disclosed the use of customized, heated dies, which utilize mechanical fingers, alone or in combination with a metal surface, to impart the desired corrective characteristics to a lens blank. This method is disadvantageous in that it is unsuitable for the production of certain ophthalmic lenses, such as soft contact lenses because soft contact lens materials are thermoset that cannot be deformed with heat. Additionally, this method is disadvantageous in that molding the lens material using a heated die requires that the lens blanks' optical axis be perfectly aligned with that of the die, which adds a great degree of difficulty to production of the lens. Therefore, a need exists for a method to produce ophthalmic lenses with a mold that permits reduction of lens inventory and which overcomes some or all of these disadvantages.

Shape memory polymers (SMPs) were developed about 20 years ago and have been the subject of commercial development in the last 10 years. SMPs derive their name from their inherent ability to return to their original "memorized" shape after undergoing a shape deformation. SMPs that have been preformed can be deformed to any desired shape below or above their glass transition temperatures ($T_g$). If it is below the $T_g$, this process is called cold deformation. When deformation of a plastic occurs above its $T_g$, the process is denoted as warm deformation. In either case the SMP must remain below, or be quenched to below, its $T_g$, while maintained in the desired thermoformed shape to "lock" in the deformation. Once the deformation is locked in, the polymer network cannot return to a relaxed state due to thermal barriers. The SMP will hold its deformed shape indefinitely until it is heated above its $T_g$, whereat the SMP stored mechanical strain is released and the SMP returns to its preformed state.

Several polymer types exhibit shape memory properties. Probably the best known and best researched polymer type exhibiting shape memory properties is polyurethane polymers. Gordon, *Proc of First Intl. Conf. Shape Memory and Superelastic Tech.*, 115–120 (1994) and Tobushi et al., *Proc of First Intl. Conf. Shape Memory and Superelastic Tech.*, 109–114 (1994) exemplify studies directed to properties and application of shape memory polyurethanes. Another known polymeric system, disclosed by Kagami et al., *Macromol. Rapid Communication*, 17, 539–543 (1996), is a class of copolymers of stearyl acrylate and acrylic acid or methyl acrylate. Other SMP polymers known in the art include articles formed of norbornene or dimethaneoctahydronaphthalene homopolymers or copolymers, set forth in U.S. Pat. No. 4,831,094, incorporated herein by reference.

SUMMARY OF THE INVENTION

In accordance with the present invention, an ophthalmic mold comprising a shape memory polymer (SMP) or shape memory alloy (SMA) is provided. The mold preferably comprises at least two mold members, preferably two mold members, of which at least one mold member comprises a SMP or SMA. The mold preferably comprises a front curve and a back curve, and is preferably used to form a contact lens; however, the ophthalmic products that may be formed using the ophthalmic molds of this invention include spectacle lenses, contact lenses, interocular lenses or the like.

Additionally, this invention provides a molding surface of an agile tool or as referred to in U.S. Ser. No. 09/649,635, a deformable mold comprising a SMP or SMA; however, the focus of the description will be the formation of an ophthalmic mold comprising an SMP or SMA; however, the teachings herein can be applied to the molding surface of the agile tool.

The mold of this invention comprising an SMP or SMA can be used to make a lens and then re-shaped and re-used to form another lens, thereby reducing the amount of mold material consumed in a lens manufacturing facility. Additionally in alternative embodiments, the molds formed by the methods described below can be used to produce more varied contact lenses and even customized contact lenses at a lower cost than if metal inserts had to be fabricated to make each mold member. Additionally, by using the mold of this invention in manufacturing ophthalmic products, a mechanical demold step, used in the prior art to remove an ophthalmic product molded within the mold, may be eliminated and replaced with the step of heating the mold comprising a SMP or SMA above its Tg to cause the mold to deform, at which time the ophthalmic product can be removed from the mold without the mechanical demold step.

Further, the molds of this invention are not formed by injection molding at high temperature, i.e. as high as 300° C., and elevated pressure, thereby providing new types of materials that can be used to make the devices, that shape the ophthalmic molds. By forming molds by methods other than injection-molding, different mold forming materials, and methods can be used to make the molds. Additionally, if the agile tools described herein are used to make the molds a full prescriptive range of lenses can be produced while reducing the number of molds required, and eliminating all the injection-molding tools required to do the same. Further, the molds of the invention may be used in a method for the delivery of customized ophthalmic lenses to a lens wearer.

BRIEF DESCRIPTION OF THE DRAWINGS

The present invention will be better understood by reference to the following drawings of which.

Figure 1:
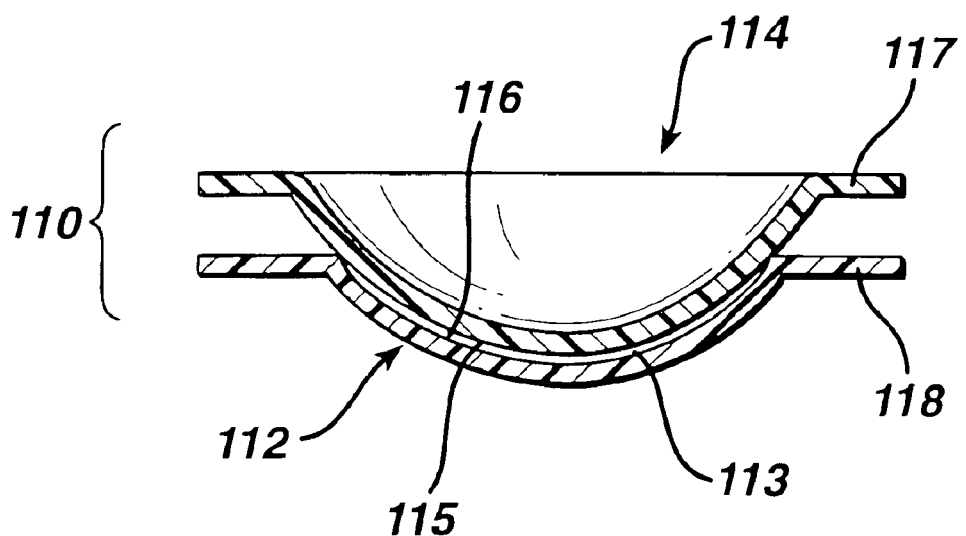
FIG. 1 is an ophthalmic lens mold of this invention.

The present invention uniquely employs shape memory polymer (SMP) or or shape memory alloys (SMA), preferably shape memory polymers, as the material of construction of a mold in the manufacture of ophthalmic products, preferably contact lenses. The molds may comprise one or multiple pieces or members. Preferably, the molds comprise two mold members of which at least one mold member comprises a SMP or SMA. The terms "ophthalmic lens mold", "ophthalmic mold", "mold" and "mold member" "first mold member", "second mold member", "front curve", "front curve lens mold", "back curve", "back curve lens mold", will be used to refer to the molds or parts of the mold of this invention used to form ophthalmic products.

Shape memory polymers and alloys having the properties discussed earlier may be utilized in the formation of the molds. Thus, shape memory polymers, which include polyurethane polymers, norbornene homopolymers and copolymers of norbornene and alkylated, cyano, alkoxylated, mono- or diesterified imides or carboxylic acid derivatives may be employed. In addition, the copolymer may include, as a comonomer, dimethaneoctahydronaphthalene (DMON). Alternatively, hompolymers of DMON, as well as copolymers of DMON and styrene, acenaphthalene or dicyclopentadiene, which may be hydrogenated or halogenated, may be employed. Additionally, the SMP may comprise copolymers of stearyl acrylate, acrylic acid or methyl acrylate The SMP used to form the ophthalmic mold is preferably a thermosetting resin, cured by radiation or heat.

Shape memory alloys may also be used to form the molds of this invention to be used for forming ophthalmic products. Such shape memory alloys include Nitinol, which is a nickel and titanium alloy (NiTi), copper, aluminum and cobalt alloys and copper-nickel-titanium-aluminum alloys. The use of shape memory polymers is preferred over shape memory alloys, therefore, the description below may refer to the shape memory polymers and not the shape memory alloys; however, that is not meant to be limiting, and the term shape memory alloy may be added where ever the term shape memory polymer appears.

Although the above discussed shape memory polymers are within the contemplation of the present invention, it is preferred that the shape memory polymer, employed in the formation of the contact lens of the present invention, be a new SMP, a copolymer of styrene and a vinyl compound other than styrene. This SMP is described in copending and concurrently filed application, U.S. application Ser. No. 10/056,590, which is incorporated herein by reference.

The preferred SMP is prepared from a reaction mixture which includes, in addition to styrene and the vinyl compound, a crosslinking agent and an initiator, and an modifying polymer.

The second monomer, a vinyl compound other than styrene, is preferably vinyl neodecanoate, vinyl benzoate, vinyl propionate, vinyl stearate, a methylstyrene, which may be a mixture, 3-methylstyrene or 4-methylstyrene, a vinyl pyridine, which may be a mixture, 2-vinyl pyridine, 3-vinyl pyridine or 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, N-vinyl-N-methylacetamide, 1-vinylimidazole, N-vinylformamide, N-vinylcaprolactam, vinyl azolactone, N-vinylurea, 4-(vinyloxy)butyl stearate, 4-(vinyloxy)butyl benzoate, 4-(vinyloxymethyl)cyclohexylmethyl benzoate, methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyethyl methacrylate, dodecyl acrylate, dodecyl methacrylate, 2-ethoxyethyl methacrylate, 2-ethylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl)-ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phenoxyethyl methacrylate, phenyl acrylate, 2-phenylethyl acrylate, 2-phenylethyl methacrylate, phenyl methacrylate, propyl acrylate, propyl methacrylate, stearyl acrylate, stearyl methacrylate, 2,4,6-tribromophenyl acrylate, undecyl acrylate or undecyl methacrylate.

Of the vinyl compounds preferred for use in the reaction mixture of the shape memory polymer of the present invention, vinyl neodecanoate, vinyl benzoate, vinyl propionate, vinyl stearate, a methylstyrene, 4-(vinyloxy) butyl stearate or a vinyl pyridine are particularly preferred.

The crosslinking agent of the shape memory polymer reaction mixture is multifunctional, that is, the crosslinking agent is a compound that has a polymerizable functionality of at least 2. Difunctional crosslinking agents are preferred. Crosslinking agents within the scope of the present invention include diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-haxadiene, 1,6-hexanediol diacrylate, 1,6-hexanediol diacrylate, 1,6-hexanediol dimethacrylate, N,N'-methylenebismethacrylamide, 1,9-nonanediol dimethacryalte, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl)phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl] isophthalate, bis[4-(vinyloxymethyl)cyclohexylmethyl] glutarate, bis[-(vinyloxy)butyl]succinate, bis((4-vinyloxy) methyl)cyclohexyl)methyl)isophthalate, bis(4-(vinyloxy) butyl)terephthalate, bis[[(4-[vinyloxy)methyl)cyclohexyl] methyl]terephthalate, bis[4-vinyloxy)butyl]adipate, bis[4-(vinyloxy)butyl] (methylenedi-1,4-phenylene)biscarbamate, bis[4-(vinyloxy)butyl] (4-methyl-1,3-phenylene) biscarbamate, bis[4-(vinyloxy)butyl] 1,6-hexanediylbiscarbamate or tris[4-(vinyloxy)butyl] trimellitate.

Of these preferred crosslinking agents, divinyl benzene, bis[4-(vinyloxy)butyl]terephthalate and bis[[4-[(vinyloxy) methyl]cyclohexyl]methyl terephthalate are particularly preferred. Of these, divinyl benzene is even more particularly preferred as the crosslinking agent.

The initiator of the reaction mixture may be a free radical or an ionic initiator. Free radical initiators within the scope of the present invention include organic peroxides and azo compounds. Although any of the commercially available organic peroxides may be utilized, tert-butyl peroxide, tert-butyl hydroperoxide, benzoyl peroxide, dicumyl peroxide and lauroyl peroxide are particularly preferred. Similarly, although any commercially available azo initiating compounds may be utilized, 2,2'-azobisisobutyronitrile is particularly preferred. The ionic initiators are preferably cationic initiators. Preferred cationic initiators include boron trifluoride, boron trifluoride diethyl etherate, aluminum trichloride and tin (IV) chloride.

As stated above, the SMP reaction mixture may include a fifth, optional component. This fifth component of the shape memory polymer reaction mixture is optional. That optional component is a modifying polymer. The modifying polymer acts as a viscosity adjustor and, additionally provides the requisite toughness to the resultant shape memory polymer.

The modifying polymer of the shape memory polymer reaction mixture is a thermoplastic polymer that is compatible with the polymer formed by the reaction product of styrene and a vinyl compound. Preferred compatible polymers include olefin polymers and styrene polymers. Particularly preferred compatible polymers include polystyrene, poly(styrene-co-butadiene), polyethylene and polypropylene. Of these, polystyrene is particularly preferred as the modifying polymer in the shape memory polymer reaction mixture.

The constituents of the shape memory polymer reaction mixture are present such that the styrene monomer constituent represents between about 30% to about 95%, the vinyl monomer constitutes between about 5% and about 60%, the crosslinking agent constitutes between about 0.5% and about 5%, the initiator is present in a concentration in the range of between about 0.1% and about 4% and the modifying polymer, if present, represents between about 0.5% and about 60%, all of the above recited percentages being by weight based on the total weight of the shape memory polymer reaction mixture.

Preferably, the constituents of the shape memory polymer reaction mixture are present in the following concentration ranges, again reported as percentage by weight, based on the total weight of the reaction mixture: styrene monomer, about 40% to about 85%; vinyl monomer, about 5% to about 20%; crosslinking agent, about 0.6% to about 3%; initiator, about 0.5% to about 3%; and modifying polymer, if present about 5% to about 50%.

More preferably, the constituents of the shape memory polymer reaction mixture include between about 50% and about 80% styrene monomer; between about 5% and about 14% vinyl monomer; between about 1% and about 2.5% initiator; and, if present, between about 10% and about 40% modifying polymer. As previously, these percentages are by weight, based on the total weight of the shape memory polymer reaction mixture.

The shape memory polymer reaction mixture is polymerized by reacting the mixture at a temperature in the range of between about 20° C. and about 150° C. and a pressure in the range of between about 14.7 psi and about 50 psi over a time period in the range of between about 2 seconds and 4 days to produce a crosslinked shape memory polymer.

In a preferred embodiment, the polymerization reaction, to produce the thermosetting shape memory polymer of the present invention, occurs at a temperature in the range of between about 50° C. and about 110° C. and a pressure in the range of between about 14.7 psi and about 25 psi over a period of between about 1 minute and 3 days.

More preferably, the polymerization reaction conditions, used to form the shape memory polymer sheet that is formed from the shape memory polymer reaction mixture, are as follows: a temperature in the range of between about 65° C. and about 75° C., a pressure of about 14.7 psi for a period of between about 4 hours and about 1.25 days.

The mold of this invention comprising SMP and SMA can have any shape useful for forming an ophthalmic product.

One embodiment of a mold of this invention is shown in FIG. 1. FIG. 1 shows a mold 110 comprising a first mold member 112 and a second mold member 114. The mold 110 is shown with the first and second mold members 112, 114 assembled to form a cavity 113 into which a lens forming material is preferably dosed prior to assembly of the mold members. After assembly of the mold members to form the mold 110, the lens forming material is preferably cured or crosslinked to form an ophthalmic product. Surface 116 of the first mold member 112 and surface 115 of the second mold member 114 are optically critical surfaces (also referred to herein as the optical forming surfaces) of the mold, because they are the surfaces of the mold that contact the lens forming material, and those surfaces 115, 116 impart the optical characteristics to the ophthalmic product formed within the mold 110. By "optical characteristics" is meant one or more spherical, aspheric, toric, cylindrical curvature, or other wavefront corrections, and the like and combinations thereof.

The first and second mold members 112, 114 are shown comprising optional flanges 118, 117. As shown, the mold 110 is suitable for making a contact lens. For the formation of contact lenses the first mold member 112 may be referred to as the front curve lens mold or front curve, and the second mold member 114 as the back curve or back curve lens mold, and the mold 110 may be referred to as a lens assembly. In the prior art the front curves and back curves are often made by injection molding, as described in the "Background of the Invention."

This invention will be described with reference to the preferred embodiment used in the formation of contact lenses; however, it is understood that the molds of this invention can be used to make other ophthalmic products.

The fabrication of the molds comprising a shape memory polymer is accomplished by methods that take advantage of the unique properties of these polymers. In one preferred embodiment the shape memory polymer contact lens mold is prepared in a hot forming method in which a sheet, preferably disc-shaped, however various shapes can be used, of a shape memory polymer is formed into the desired contact lens mold shape, corresponding to the desired contact lens to be formed using the mold, by means of a press. The term "press" is used to describe a device used to shape the SMP. The press comprises at least one surface that contacts the SMP.

Figure 2:
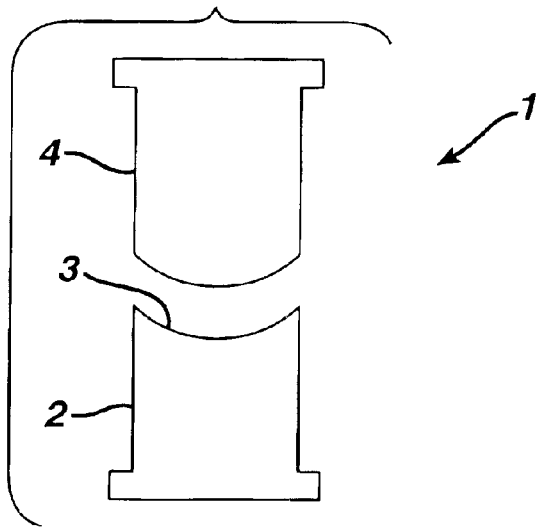
FIG. 2 is a sectional elevational view of a first mold member forming press.
Figure 3:
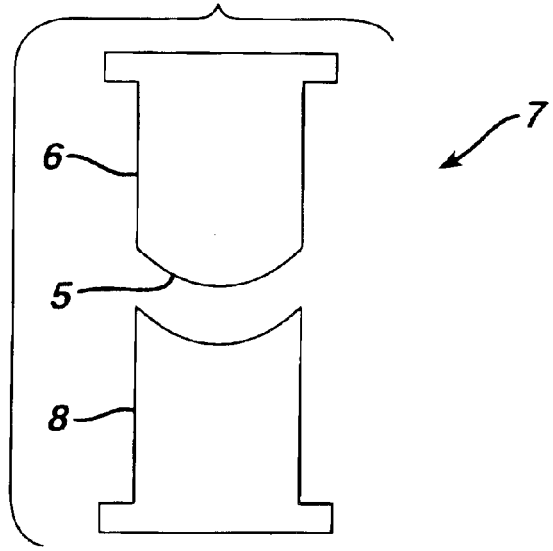
FIG. 3 is a sectional elevational view of a second mold member forming press.

One embodiment of the press used in the present invention is as shown in FIGS. 2 and 3 constitutes a second mold member forming press or second press 1 and a first mold member forming press or first press 7. The second press 1 includes a base curve element 2 and a core element 4. The first press 7 includes a front curve element 6 and a core element 8. The base curve element 2 and front curve element 6 may be formed by diamond point turning and/or polishing of an appropriate metal, e.g. brass. Alternatively, the metal may be metal plated, e.g. nickel plated. Preferably, the smoothness of the base curve element 2 and front curve element 6 is such that the surface roughness of these elements is no more than a root mean square roughness (RMS) of about 20 nanometers. It is emphasized that the base curve element 2 and front curve element 6 of the press 1, 7 define the surfaces 115, 116 of the second and first mold members 114, 112, respectively, that are the optically critical surfaces of the mold because those surfaces of the mold contact the lens forming material molded into the lens. Although smooth surfaces 3 and 5 of the base curve elements 2 and front curve element 6, respectively, are depicted as spherical, they may be toric shaped, bifocal shaped, shaped to correct for wavefront aberrations, or another shape reflecting other contact lens designs.

The core elements 4,8 of the second and first mold forming presses 1,7 are depicted in the drawings as solids. The core elements 4,8 are preferably made of elastomers, or metals, or a combination of these materials. The core elements 4,8 may comprise the same metals used to make the front curve element 6 and base curve element 2. The surface of the core elements 4,8 typically are not subject to any smoothness requirement.

In another embodiment, the core element is not a solid element, but is provided by gas pressure or the like. In a preferred embodiment the gas is air, with the proviso that the gas is inert insofar as it does not react with the SMP material. Alternatively, a vacuum may be pulled on the base curve element 2 or front curve element 6 sides of the presses to pull the shape memory polymer sheet against the base curve element or front curve element. The key is the pressure differential across the sheet pushing or pulling the sheet against the base curve element or front curve element.

Figure 4:
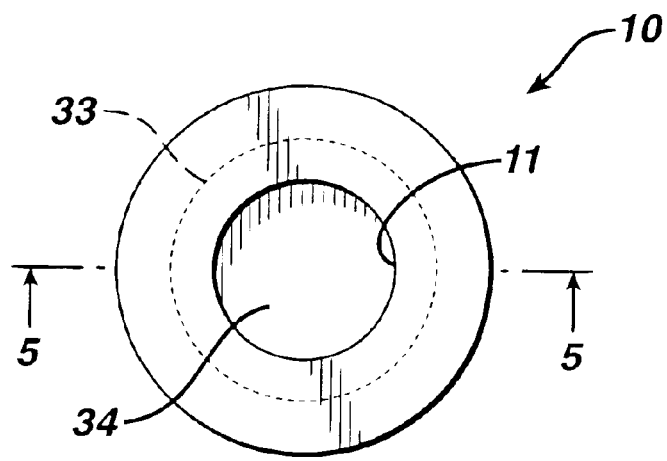
FIG. 4 is top view of a shape memory polymer or alloy holder.
Figure 5:
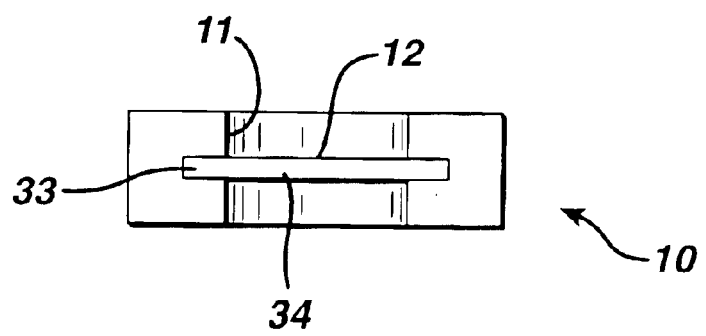
FIG. 5 is a sectional elevational view of the holder of FIG. 4 shown holding a shape memory polymer or alloy sheet.
Figure 6:
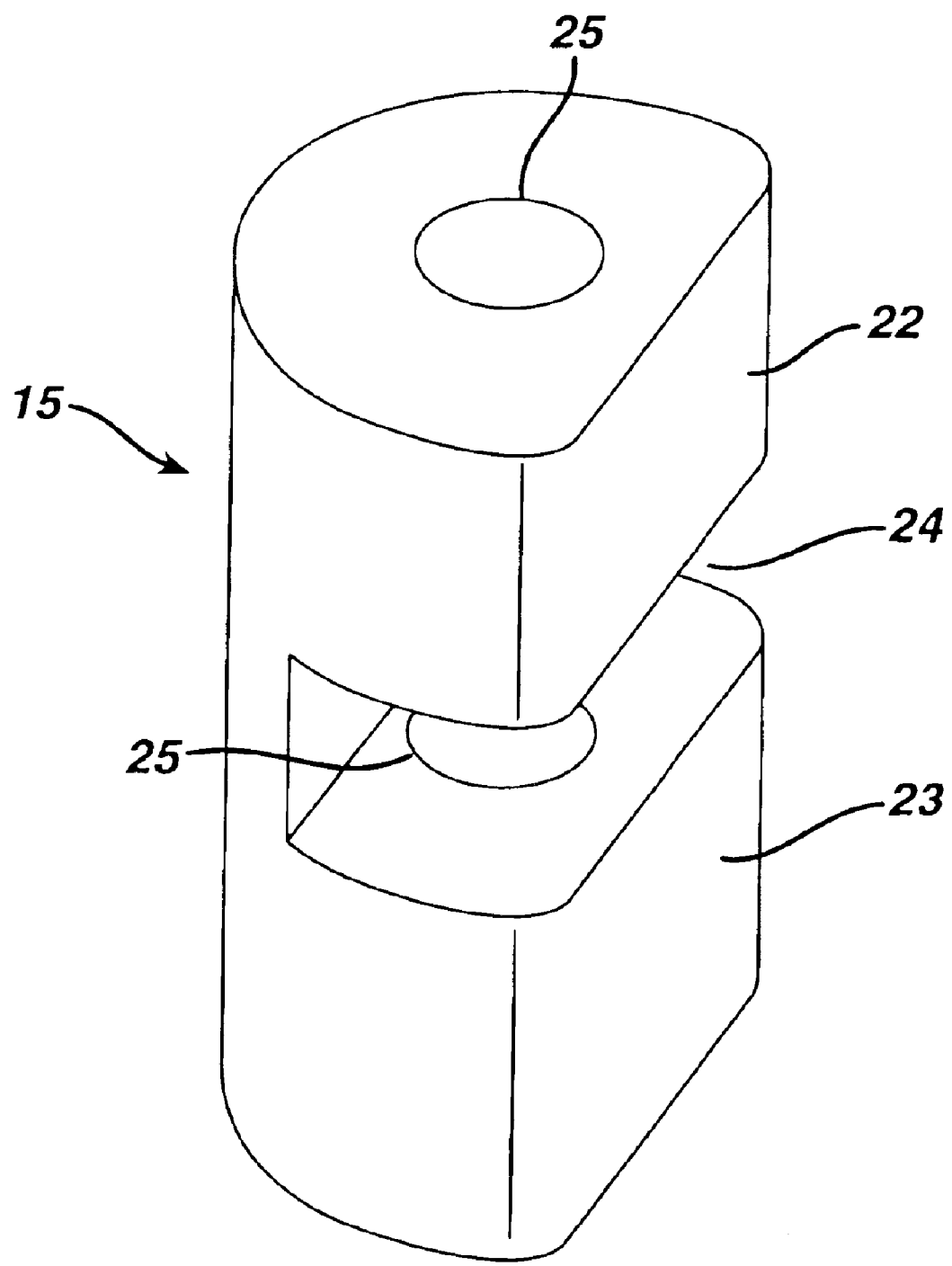
FIG. 6 is depiction of an alignment jig utilized in the formation of mold members employing a press or an agile tool.

In operation, for example in reference to the second mold member forming press 1, a shape memory polymer or alloy sheet 12 is formed into a second mold member while being held by a shape memory polymer or alloy holder 10, (shown in FIGS. 4 and 5) between the core element 4 and the base curve element 2 having smooth surface 3. The SMP sheet is preferably a flat sheet, and shown as round; however other shapes may be used. The SMP sheet 12 is inserted into holder 10 as shown in FIGS. 4 and 5. The holder 10 is accommodated in an alignment jig 15 shown in FIG. 6. Holder 10 effectively holds the SMP sheet 12 at its edges 33 so that the edges 33 of the SMP sheet 12 form the flange 117 of the mold member 114. The holder 10 maintains the edges 33 of the SMP sheet in fixed position while the center portion 34 of the sheet 12 is shaped in the form of a mold member 114. The holder 10 holds SMP sheet 12 without restricting the deformation of the center portion 34 of the sheet 12. Next, the base curve element 2 and core element 4 are introduced into the alignment jig 15 discussed below. Prior to any contact with the SMP sheet, the temperature of the SMP sheet is raised to or above the glass transition temperature of the SMP. The SMP may be heated to a temperature above its glass transition temperature by exposing the SMP sheet to radiation, such as IR radiation, a hot gas, or by conduction (heating the holder). The SMP temperature preferably should be heated to and maintained within a few degrees above the glass transition temperature because further heating will likely not change the modulus (stiffness) of the material and would only increase the heating time and energy requirements. After heating the SMP, the base curve element 2 is pressed into core element 4 under appropriate pressure. After a short period of time, the temperature of the press 1 is thereupon reduced to below the SMP glass transition temperature for a sufficient time period for the SMP to drop to a temperature below its glass transition temperature. The sample may be cooled by, for example, removing the heating source only, removing the heating source and exposing the sample to a cool gas stream, or by removing the heating source and running a cooling fluid through the base curve element 2. The SMP temperature should be reduced to a few degrees below the glass transition temperature. Further cooling will likely only increase the cooling time. At this time, the holder 10 is removed from the jig 15, and the deformed SMP sheet 12, in the form of a second mold member 114, is removed from the holder 10.

A similar procedure takes place in forming the first mold member 112. That mold member is identically prepared except that the diamond point turned, polished or nickel plated coated surface 5 of the front curve element 6 cooperates with a core element 8 of the front curve forming press 7 to form a first mold member 112 having an optically critical surface 116 as shown in FIG. 1.

Figure 7:
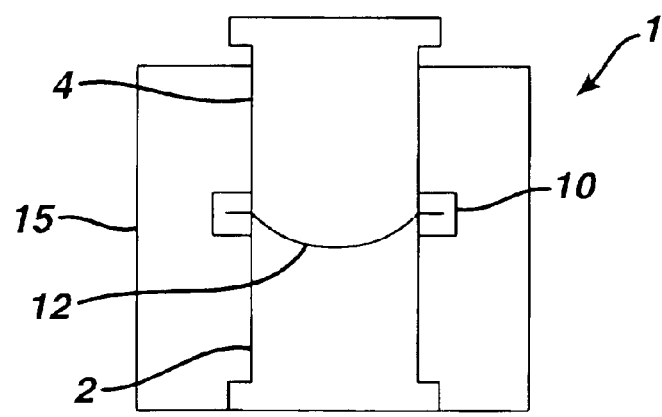
FIG. 7 is a sectional elevational view of the first mold member forming press operating on a shape memory polymer or alloy sheet.
Figure 8:
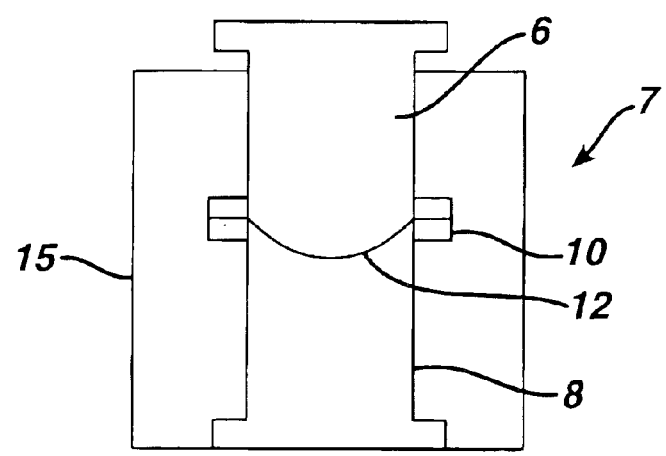
FIG. 8 is a sectional elevational view of the second mold member forming press operating on a shape memory polymer or alloy sheet.

The above mold forming process is best accomplished employing an alignment jig 15. Alignment jig 15 includes a top element 22, and a bottom element 23 defining a groove opening 24 therebetween. Top and bottom elements 22 and 23 have an aligned opening 25. The holder 10 is accommodated in the groove opening 24. Holder 10 includes an opening 11 which is aligned in alignment jig 15 so that openings 11 and 25 are in register. The press elements fit into opening 11 and 25 so that the press elements are aligned with respect to each other and with respect to the SMP holder 10. The second mold member is shown being formed in press 1 within jig 15 in FIG. 7. The first mold member is shown being formed in press 7 within jig 15 in FIG. 8.

The elements of the presses and the elements of any of the other embodiments described below for forming the mold of this invention, may be brought into contact for purposes of forming the mold using any suitable contacting means including, without limitation, stepper motors, screw drives, or the like, and combinations thereof.

Another method of fabricating an ophthalmic mold comprising a shape memory polymer is by use of an agile deformable mold, as described in the parent application U.S. Ser. No. 09/649,635. To avoid confusion between the mold that is being claimed herein and the agile mold described in the parent application and further described here, the agile mold will be referred to herein as an "agile tool". The agile tool preferably is used to make an ophthalmic mold or an ophthalmic mold member, which is then used to make an ophthalmic product. The agile tool comprises a molding surface that is capable of being deformed. The molding surface of the agile tool is deformed by adjustment means.

One type of agile tool useful in making the molds of this invention comprises a layer which may be composite of materials or layers of which the non-molding side of the layer or non-molding surface of the agile tool is contacted with the adjustment means and the molding side of the layer or molding surface of the agile tool contacts the SMP that forms the ophthalmic mold. At least a portion of the molding surface of the agile tool is capable of being deformed and has a first shape that may be of any shape, but conveniently is of a concave or convex shape having a first radius of curvature $R_1$. This deformable portion of the molding surface of the agile tool is capable of being deformed by action of the adjustment means preferably against the non-molding surface of the agile tool so that the deformable portion assumes a second shape that is desired to be imparted to at least a portion of a surface of the ophthalmic mold to be produced in the agile tool. The second shape of the molding surface of the agile tool imparts the desired optical characteristics to the mold.

As stated earlier, "optical characteristics" is meant one or more of spherical, aspheric, toric, or cylindric curvature, or other wavefront aberrations and the like and combinations thereof. The optical characteristic imparted will depend on the aberrations of the lens wearer's eye desired to be corrected. The agile tool is suitable for producing molds to produce ophthalmic products for correction of any wavefront aberration of the eye, meaning any departure from a spherical wavefront. These aberrations include, without limitation, astigmatism, defocus, coma, spherical aberrations, distortion, and the like. These aberrations also may be defined using Zernike polynomials.

The layer and/or at least the molding surface of the agile tool may be formed by any material capable of being deformed, capable of withstanding the stresses imposed by the SMP or SMA mold manufacturing process, and capable when deformed of maintaining a shape suitable for imparting the desired optical characteristics to the mold to be formed using the agile tool. The surface of the agile tool must be deformable and non-reactive with the SMP or SMA used to form the mold member in the agile tool. Suitable agile tool layer or molding surface materials include, without limitation, metals, polymers, metalized polymers and the like and combinations thereof. Exemplary of these materials are aluminum, gold, brass, and nickel metals, polyolefin polymers including, without limitation, polyethylene and polypropylene, polyethylene terphthalate, silicone polymers, electro-active polymers such as polyanilines, polypyrroles, ion exchange polymer metal matrix compositions and the like, shape-memory polymers such as segmented polyurethanes, and any of the other SP's described earlier, ceramics such as silicon carbide, shape-memory alloys such as nitinol, and the like and combinations thereof. These materials are commercially available or methods for their production are known.

The agile tool molding surface preferably has an optical quality surface finish if it contacts the optically critical surface(s) of the SMP or SMA mold. The non-molding surface of the agile tool need not have an optical quality finish. However, the non-molding surface of the agile tool must be sufficiently pliant, flexible, and durable to enable its repeated contact, and action upon it by, the adjustment means, and may be formed from an elastomer or the like.

Preferably, the molding surface of the agile tool, singly or in combination with the non-molding surface of the agile tool, is in the form of a membrane, more preferably a polymeric membrane. In a most preferred embodiment, the molding surface is a membrane of a size and shape suitable for production of a soft contact lens and is about 0.5 to about 5000, preferably 1 to about 1000 microns in thickness.

Adjustment means may contact the non-molding surface of the agile tool of the invention under conditions suitable to deform the deformable portion of the molding surface of the agile tool to the desired shape. Adjustment means may be any means capable of manipulating and deforming the deformable portion of the molding surface of the agile tool to the degree necessary to obtain the desired configuration of the molding surface of the agile tool. Examples of such adjustment means include, without limitation, fluids, micro-actuators, such as piezo-electric, micro-motorized, or hydraulic micro-actuators, magneto-restrictive actuators, electro-static actuators, electro-active polymers, and the like that move in response to an input signal. For example, by varying the voltage applied to a series of piezo-electric micro-actuators, the deformable portion of the molding surface may be displaced so that it assumes a desired shape. An array of pins or concentric tubes wherein each pin or tube is capable of having its height individually adjusted, relative to a datum and locked into place to thereby form the desired shape can be used as the adjustment means.

In embodiments in which micro-actuators in the agile tools are used to form the molds of this invention, spacing of the actuators may be determined by the resolution requirement of the surface of the mold to be formed by the agile tool and ultimately the ophthalmic product to be formed by the mold. The resolution requirements will be determined by the features desired to be imparted onto the surface of the mold and/or lens. The adjustment means may be used in combination with heat to alter the shape of the molding surface of the agile tool. The use of heat will be required if the molding surface of the agile tool also comprises an SMP or SMA. The Tg of the SMP or SMA that is used as the deformable surface of the agile tool should be higher than that of the SMA used to form the ophthalmic lens mold.

Figure 9:
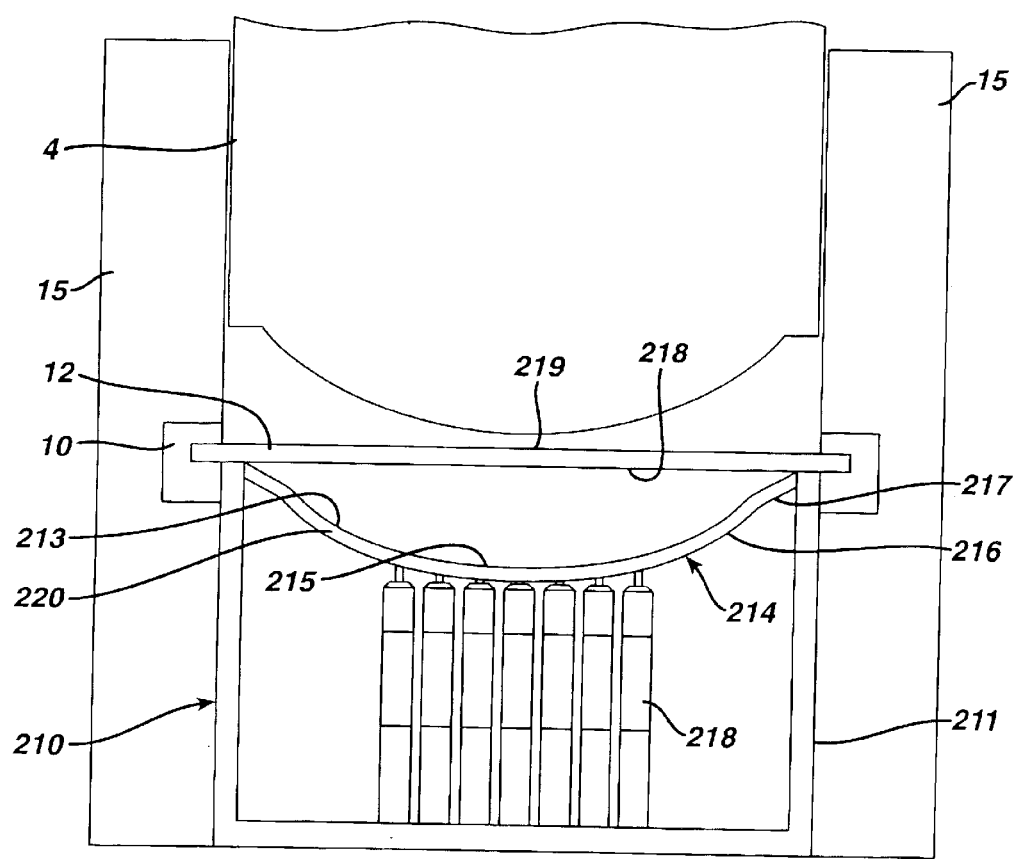
FIG. 9 is a sectional elevation view of the disposition of an SMP or SMA sheet in an agile tool with a core element prior to mold member formation.
Figure 10:
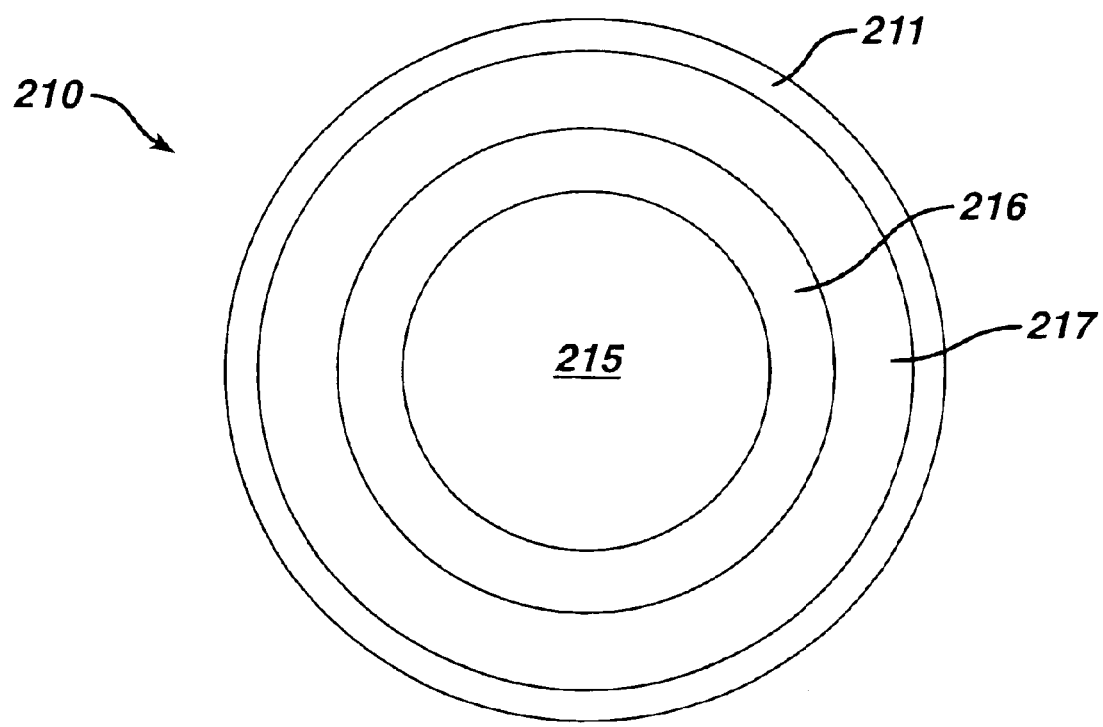
FIG. 10 is a top plan view of the agile tool of FIG. 9.

FIGS. 9 and 10 show an exemplary agile tool 210 used to make a mold of the invention comprising shape memory polymer or alloy. The agile tool has a layer 220 which may be a single material or may comprise several materials or layers having a concave molding surface 213 and convex non-molding surface 214. Enclosure 211 is shown supporting agile tool 210. An array of micro-actuators 218 is shown contacting non-molding surface 214, which acts as the adjustment means. Molding surface 213 has a portion 215 that is deformable and of a first shape of a radius of curvature $R_1$, which radius will change upon actuation of the adjustment means. Additionally, as shown, molding surface 213 has areas 216 and 217 each of a fixed radius of curvature. Area 216 is continuous with and extends around portion 215. Area 217 is continuous with and extends around area 216. The mold to be formed by areas 216 and 217 are those that will form the portions of the lens outside the optical zone of the lens. In an alternative embodiment, areas 216 and 217 also may have unfixed radii of curvature and be subject to the adjustment means. When the plurality of actuators 218 are actuated and moves non-molding surface 214, this causes the deformable portion 215 of molding surface 213 to be deformed to the desired shape.

The agile tool 210 shown in FIGS. 9 and 10 is preferably used to form a second mold member or back curve. For purposes of molding a mold member, a core element 4 complementary to agile tool 210 may be used, as shown in FIG. 9. Another agile tool (not shown) can be used with a complementary core element (not shown) to form the first mold member or front curve, similar to the use of the pair of presses shown in FIGS. 1 and 2 to make the pair of mold members. However, a single agile tool that can widely adjust its molding surface from convex to concave could be used in combination with one or more core elements to form both mold members, if desired.

After the actuated surface 213, whose shape is controlled by adjustment means 218, is set to the desired shape, the SMP material 12, which may be flat or preformed into spherical or toric shape, is introduced to the agile tool 210 in a manner that may be analogous with the method employed in the press process. That is, an alignment jig 15, in which an SMP holder 10 is disposed, is utilized to dispose the SMP 12 between a core element 4 and the molding surface 213. Upon disposition of the SMP 12 into an agile tool 210, and after the temperature of the SMP is raised to or above the SMP glass transition temperature, the core element 4, presses the SMP 12 into contact with the actuated surface 213, at the requisite pressure. The temperature is then reduced below the SMP glass transition temperature, preferably to ambient temperature, until the temperature of the SMP decreases below its glass transition temperature, and then core element 4, is lifted from the SMP 12. Then, SMP 12, in the shape of a contact lens mold half, is removed from agile tool 213. The same process may be repeated to form a first mold member using an agile tool shaped to form the first mold member (not shown).

Alternatively, instead of or in addition to, setting the actuated surface 213, whose shape is controlled by adjustment means 218, to the desired shape prior to introduction of the SMP sheet into the agile mold, the adjustment means 218 may be changed while the SMP sheet is in contact with the agile mold.

In alternative embodiments for making the mold of this invention using an agile tool, the core element 4 as shown in FIG. 9 may be replaced by a stream of gas (not shown), or by a vacuum (not shown) pulled on the surface 218 of the sheet 12. In embodiments in which gas pressure is used to press the sheet 12 against the molding surface 213, so that sheet 12 takes the shape of the molding surface 213, the optical forming surface of the mold may be formed on either surface 218 or 219 of sheet 12. If the optical forming surface is formed on surface 219 of sheet 12, the layer 220 of the agile tool 210 may or may not be used. (Actually if the surface roughness of the adjustment means without any layer is low enough, although this would complicate the fabrication of the adjustment means, the layer of the agile mold would be optional even if the optical forming surface of the mold is the surface pressed against the adjustment means.) It is preferred that in the embodiments using gas pressure as the core element that the optical forming surface of the SMP 12 will not contact any solid surface that will impart its surface imperfections to the optical forming surface of the mold and thereby to the lens made using the mold. The optical forming surface of a mold, that is, the surface of the mold that contacts the lens forming material, preferably has a root mean square surface roughness of no more than about 20 nanometers. It is presently believed that the methods that use gas pressure as the core element, and, during which the optical forming surface is not contacted by any solids, provide the smoothest optical forming surfaces, because surface smoothness of the resulting mold member is equal to that of the starting material (sheet 12), which typically is well below 20 nm RMS.

Note that in the embodiment employing a press wherein the core element was provided by air or gas pressure, as described earlier, the optical forming surface was not contacted by the air or gas; however, that embodiment could be modified to provide that the optical forming surface could be the one contacted by the air or gas to provide the benefits just described. Additionally in any of these embodiments that use a stream of gas, that preferably is inert to the SMP, the gas stream may be used to heat and/or cool the SMP in the process of forming the mold comprising SMP. The preferred gas for these embodiments is air. However, if air reacts with the SMP employed, then a low cost inert gas, such as nitrogen, may be alternatively utilized.

As described earlier for the other embodiments, in specific operation, the agile die is preadjusted, by specific adjustment of adjustment means, to the desired shape of the SMP sheet 12 when formed into a mold member. The SMP sheet 12 may be disposed in a holder 10 and in an alignment jig 15. The jig is used to center the SMP sheet 12 with respect to the agile die. The SMP sheet, clamped at its edges in holder 10, which is disposed in alignment jig 15, is heated above its glass transition temperature. The heating step may be provided by conduction, i.e. direct heating, by such means as providing the clamp with heating means; by convection, i.e. using a heated gas; or by radiation, e.g. infrared (IR) heating. Of these heating means, radiation heating, because of the speed at which the SMP may be heated, is preferred. The SMP material is heated at or above the transition temperature, is subjected to a high pressure inert gas stream, by application of a vacuum or both. The pressure and velocity of the gas stream is such that the SMP sheet 12 assumes the shape defined by adjustment means or molding surface, if present, transferred to the side of the SMP 12 exposed to the gas stream. In an alternate embodiment, a vacuum source, may supplement or replace the gas stream. Upon formation of the desired shape, the SMP sample is cooled to ambient temperature, by removing the heating source, to "lock-in" the desired shape. The clamped edges, which form a flange for the contact lens mold halves, is released and the formed SMP contact lens mold is removed.

In another embodiment of this invention, the lens molds comprising SMP or SMA may be formed in an agile tool comprising an adjustment means that is a mechanical magnetic field deformation means. In this embodiment, a first magnetic surface contacts the layer of the agile tool. Preferably, the magnetic surface is of a shape that is complementary to the layer of the agile tool. The magnetic surface may be constructed of any magnetic material capable of withstanding the molding process environment and, preferably, is of a material that is capable of being physically or chemically bonded to the non-molding surface of the agile tool. Suitable materials include, without limitation, magnetic ferrous steels, cast or sintered alnicos, bonded or sintered ferrites, lodex, P-6 alloy, cunife, cunico, vicalloy, remalloy, platinum cobalt, cobalt-rare earth blends, and the like and combinations thereof. Alternatively, with the proper selection of materials the magnetic surface can be the molding surface.

A second magnetic surface is brought into sufficient proximity to the first magnetic surface to exert a magnetic force upon the first surface that is effective to impart a desired shape to the first magnetic surface and, through that first molding surface, to the molding surface of the agile tool. The second magnetic surface may be positioned by any convenient positioning means including, without limitation, a robotic arm, a gripper, an adjustable mechanical arm, or the like or a combination thereof. Either or both the first and second magnetic surfaces may be formed of a series of electromagnets.

Figure 11:
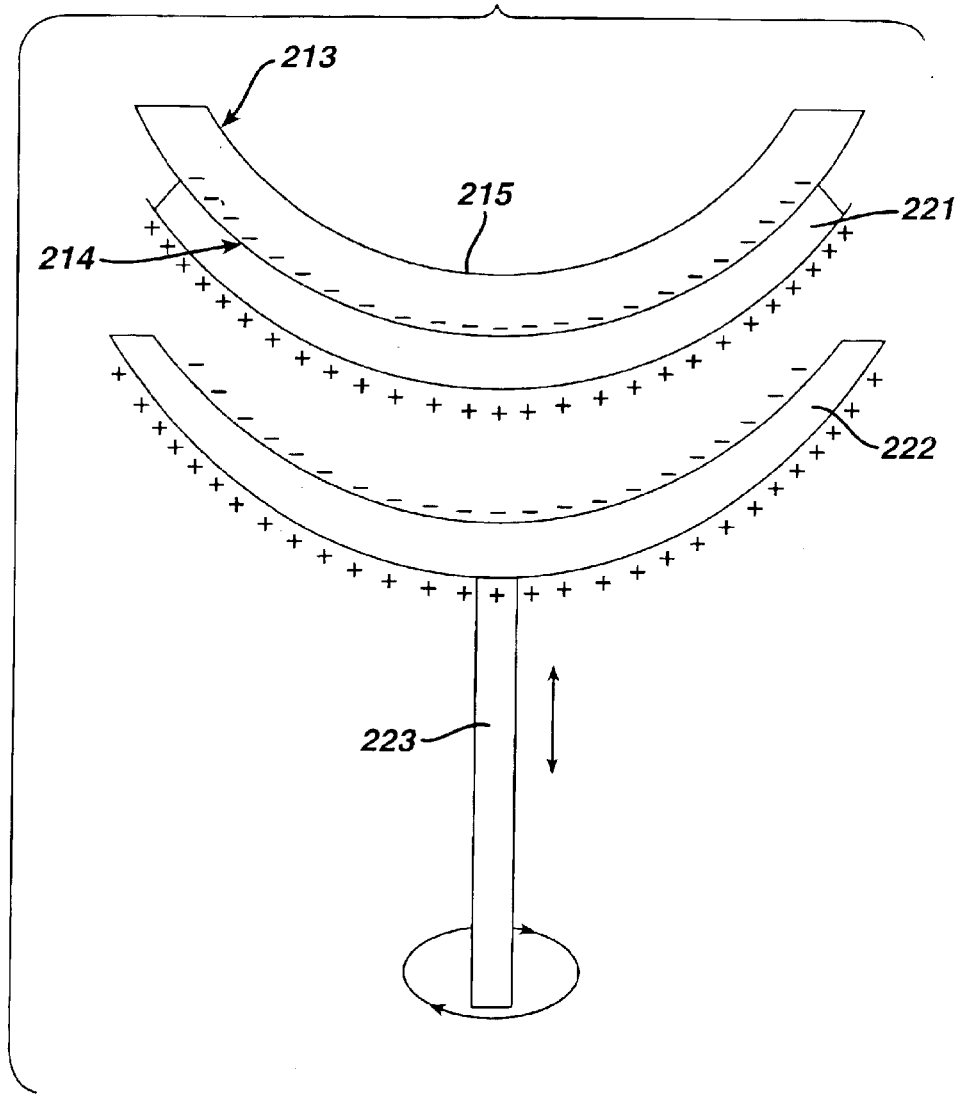
FIG. 11 is a magnified, cross-sectional view of an agile mold.

FIG. 11 shows an alternative embodiment of the invention in which the adjustment means of an agile tool used to form a mold member of the invention is a magnetic field deformation means. Molding surface 213 has deformable portion 215. Non-molding surface 214 is in contact with it first magnetic material 221. Second magnetic material 222 is brought into proximity of first magnetic material 221 by mechanical arm 223, which arm is movably mounted so that it can be manipulated in the directions shown by the arrows. A magnetic force is exerted on material 221 by material 222 resulting in the deformation of material 221 and deformable molding surface 215. Although not shown the agile tools, preferably have a feed back mechanism, such as an interferomic technique, used to feed information back to the adjustment means regarding the position and shape of the molding surface, the non-molding surface, or both.

Figure 12:
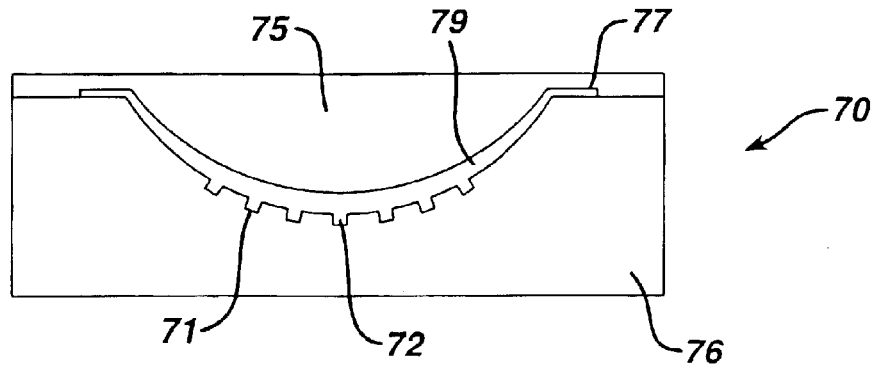
FIG. 12 is a sectional elevation view of a precast mold.
Figure 13:
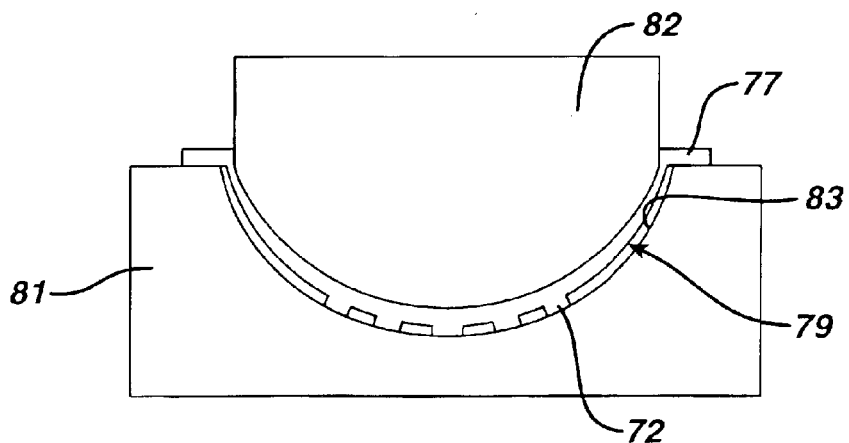
FIG. 13 is a compression fixture.
Figure 14:
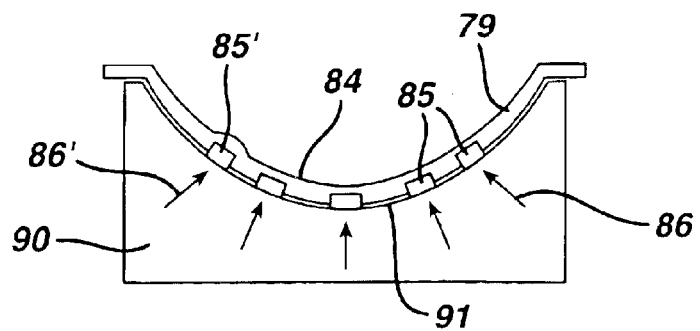
FIG. 14 is an ophthalmic mold of this invention in an agile tool.

In another embodiment, an ophthalmic mold comprising an SMP may be fabricated to incorporate intrinsic actuators. Intrinsic actuators are discrete areas of the mold, comprising the SMP that can be activated by heat that can be individually applied to the intrinsic actuators to make precise changes to the surface of the mold used to form the ophthalmic product. The precise changes are controlled by the size of the intrinsic actuators, the composition of the intrinsic actuators, and the number of intrinsic actuators heated. One method of preparing the SMP material having intrinsic actuators is illustrated in FIGS. 12, 13 and 14. In FIG. 12, the SMP is cast into a precast mold 70 to form a preform 79 formed within the precast mold 70. (The method differs from the other embodiments as described which started out with a sheet of SMP that had been cast in a flat mold, preferably a two sided flat mold having at least one optical quality surface to form the sheet (i.e. a flat preform.) The precast mold 70, as shown provides a spherical preform 79, however other shapes can be formed instead. The precast mold 70 comprises two parts, the first part 75 and the second part 76. The first and second parts 75 and 76 can comprise any materials, e.g. metal or glass; however, if it is preferred to provide an optical surface to the preform 79 at least on the surface contacting the first part 75, therefore metal or glass having an optical surface finish should be used to form the first part 75 of the precast mold 70. The second part 76 has an array or some assembly of small features 71 that provide for projections 72 on the surface of the preform 79. The projections 72 are present on the surface of the preform 79 opposite the surface that provides the optical forming surface of the ophthalmic mold that the preform 79 will be modified to become. The projections 72 can have dimensions extending from a few microns to hundreds of microns. Once the preform 79 has been formed in the precast mold 70, it is removed and further processed as shown in FIG. 13.

The preform 79 is then preferably placed in a compression fixture 81 having a bowl-shape indentation 83 similar to the shape of the preform 79 into which the preform is placed. The flange 77 of the preform 79 would be clamped to the fixture 81 by clamping means (not shown). The SMP preform will be heated to a temperature above its glass transition temperature and then compacted between the fixture 81 and a pestle 82 shaped to complement the fixture 81, both of which may be spherical, or toric or otherwise shaped. The fixture 81 and pestle 82 compress the projections 72 while retaining the overall shape of the preform 79. The preform 79 would be subsequently cooled to below its glass transition temperature, and removed from the fixture 81. The projections 72 would no longer project as far from the surface of the preform 79, but would act as intrinsic actuators 85 in the preform 79 that would be used to shape the optical forming surface 84 of the preform 79 as shown in FIG. 14.

The pestle 82 could be formed from a metal (e.g. brass) that had been diamond point turned or glass so that it has a surface roughness of 20 nm RMS, or better. It is also possible that the SMP preform 79 and projections 72 could be compressed using air pressure to replace the pestle 82.

The preform 79 can be used as an ophthalmic mold or used to form an ophthalmic mold of this invention. The surface 84 of the preform 79 is preferably formed to provide optical characteristics and/or preferably can be changed via the intrinsic actuators 85 to provide customized optical characteristics. The preform surface 84 could be modified by heating each intrinsic actuator 85 individually to a temperature above the SMP Tg, as needed, using a local heating source indicated by the arrows 86 in FIG. 14. This local heating source 86 could be a $CO_2$ laser, or an array of micro-heating coils. The heating would occur for some period of time referred to as the heating dwell time and then the intrinsic actuator 85 would be allowed to cool to a temperature below the SMP Tg. After heating and cooling the intrinsic actuator 85 the shape of the surface 84 in the area of the intrinsic actuator 85 that was heated would change. Heating the intrinsic actuator 85 will cause it to recover its original shape, either partially or entirely depending on the total heating time.

The heating of the intrinsic actuators 85 preferably occurs in an agile tool 90 shown in FIG. 14. The preform 79 is clamped into the agile tool 90 by clamping means (not shown). The agile tool 90 has an array of heaters 86 which are the adjustment means in the agile tool. The agile tool 90 also provides a molding surface 91 for the preform to be pressed against so that as the heated intrinsic actuator 85 recovers its original shape it pushes against the molding surface of the agile mold 90 thereby pushing and raising the surface 84 of the lens mold 79. By heating one or more of the intrinsic actuators 85 accordingly, the desired lens mold shape may be achieved. Alternatively, the adjustment means could be a single heater that could be moved via a computer controlled robot and positioned beneath the intrinsic actuators to be heated.

FIG. 14 shows preform 79, that will be used as an ophthalmic mold after removal from the agile tool 90, for which the intrinsic actuator 85' was heated by heating source 86' and the surface 84 of the mold was thereby modified.

The intrinsic actuators and the balance of the preform or ophthalmic mold may comprise the same shape memory polymers or different shape memory polymers. Alternatively, the intrinsic actuators may comprise a shape memory polymer and the balance of the preform may comprise an alternative material that is not a shape memory polymer that is compatible with the shape memory polymer material.

In the agile tools which may be used to form the molds of the invention, input signals to the adjustment means may be, and preferably are, the distortions or aberrations of the eye for which the lens is being manufactured. Clinical wavefront sensors, such as aberroscopes, Hartmann-Shack devices and mirror arrays capable of measuring these aberrations are commercially available. The wavefront data, or measured aberrations, may be represented by a set of mathematical coefficients, such as Zernike coefficients, that may be used to form the input signals that drive the adjustment means. The adjustment means modifies the mold to impart one or more optical characteristics onto all or a portion of a surface of the mold to be formed within the agile tool. The adjustment means may modify the mold directly or by deforming the deformable portion of the molding surface of the agile tool. Configuration of software suitable for processing and inputting the signals for purposes of driving the adjustment means is within the skill of one ordinarily skilled in the art.

The data obtained through the use of the wavefront sensors may be reported in terms of Zernike coefficients. This data then is converted mathematically into an elevation map above and below a designated mean sphere value to obtain the optical path difference. These elevations are then used to determine the shape to be imparted to a surface of the mold (and then to the lens). For the manufacture of molds, these elevations preferably will determine the shape of the optically critical surfaces of the molds.

In addition to optical characteristics, the molding surface of the agile tool, may be used to impart a geometry to the optically critical surface of a second mold member, or back curve, so that the lens formed within the mold, has a back surface that substantially corresponds with that of the lens wearer's cornea. Such modifications to the back surface may require additional modifications to the front surface via the front curve also. This function of the mold of the invention may find its greatest utility in the manufacture of contact lenses. The corneal topographic data for the lens wearer may be acquired using conventional topographers. The data initially may be applied to a soft contact lens model in an unflexed state and then by taking into account lens flexure when the lens is placed onto the wearer's eye.

For contact lenses, preferably, corneal data is used to determine the elevation map of the lens' back surface. Mapping of the corneal elevation onto the lens surface may be carried out by any known method. For soft contact lens production, preferably, mapping is carried out so that the error introduced by flexure of the lens is minimized. In this method, the corneal elevation data is applied to a soft contact lens in the unflexed state. The elevation data is then transformed by taking into account lens flexure. Further the data is manipulated for application of the data to the optically critical surface of a mold, preferably the back curve lens mold, so that it will have the intended effect on the back surface of the contact lens.

In this method, for practical considerations, it is assumed that the ideal cornea is spherical and that the actual corneal elevations and their best spherical fit are denoted f(x) and g(x), the function g(x) being part of a sphere having radius $R_a$. In general, the radius $R_b$ of an unflexed soft contact lens is spherical and is larger than that of the best spherical fit g(x). The first step is to transform the corneal elevations f(x) into a larger scale for which the best spherical fit will have a radius equal to $R_b$. One approach in simplifying the transformation is to represent the function f(x) in polar coordinates as f(θ). Then using the scale factor $\alpha = R_b/R_a$, the scaled version of the corneal elevation may be expressed as:

$$f^{(1)}(\theta) = \alpha f(\theta)$$

In the second stage, the scaled corneal elevation, f(θ), is scaled down so that the area covered by the soft contact lens corresponds to the area of the cornea. In a two dimensional case, this scaling down is obtained according to the following relationship:

$$f^{(2)}(\theta) = \alpha^{-1} f^{(1)}[(\theta - \pi/2)/\alpha + \pi/2] + R_b(1 - 1/\alpha)$$

The mapping transformations given in the above equations are not restricted to the case in which the cornea and the back surface of the contact lens are spherical. Rather, the true corneal and lens curvatures may be used to calculate the scale parameter α as a ratio between the lens and the corneal radius of curvature. In the general case, the scale parameter will be a function of θ, i.e., $\alpha = R_b(\theta)/R_a(\theta) = \alpha(\theta)$.

The mapping transformation discussed above may be generalized to the case of three dimensional transformation. In such a case, the corneal elevations may be represented by a function, f(θ,φ) where θ and φ represent the azimuth and elevation angle, respectively. The original elevation data is scaled up from the radius of curvature $R_a$ (θ,φ) using the following transformation relationship:

$$f^{(1)}(\theta,\phi) = \alpha f(\theta,\phi)$$

where $\alpha = R_b(\theta,\phi)/R_a(\theta,\phi)$.

To obtain a desired back surface of the lens, the functional $f^{(1)}(\theta,\phi)$ is scaled back down. However, in the three dimensional case, there are a number of options to choose from in performing the scaling operation such that the area is preserved. For example, if it is assumed that the deformation of the material is uniformly radial, the scaling may be performed by scaling the elevation angle only, leaving the original azimuth angle. This is expressed in the following relationship:

$$f^{(2)}(\theta,\phi) = \alpha^{-1} f^{(1)}[\theta, (\phi - \pi/2)/\alpha + \pi/2] + R_b(1 - 1/\alpha)$$

Once the mold is deformed to the desired shape, via one of the embodiments described, the mold is then used to form the desired ophthalmic product. Therefore, in another embodiment, the invention provides a process for manufacturing a mold comprising a shape memory polymer comprising, consisting essentially of, and consisting of the steps of: a.) providing an agile tool comprising adjustment means b.) adjusting said adjustment means to impart one or more optical characteristics onto a surface of a shape memory polymer or alloy; c.) placing a shape memory polymer or alloy preform into said agile tool; d.) heating at least some portion of said preform; and e.) cooling said preform.

The shape memory polymer can be introduced onto the agile tool as described above for the press, that is by using a holder and an alignment jig.

The mold of this invention is used in a process of making an ophthalmic lens. The lens-forming material may be any material suitable for forming an ophthalmic lens. Exemplary spectacle lens-forming materials include, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl-ethyl- and butyl methacrylates and acrylates, styrenics, polyesters, and the like and combinations thereof. Additionally, the lens forming material may be one or more of the phosphine oxides disclosed in U.S. Pat. No. 6,008,299 incorporated herein in its entirety by reference.

Suitable lens-forming materials for contact lenses are any materials useful for forming hard or soft contact lenses. Preferably, the lens-forming material is suitable for forming a soft contact lens. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

Suitable materials for forming intraocular lenses include, without limitation, polymethyl methacrylate, hydroxyethyl methacrylate, inert clear plastics, silicone-based polymers, and the like and combinations thereof.

Curing of the lens forming material deposited within the mold may be carried out by any means known including, without limitation, thermal, irradiation, chemical, electromagnetic radiation curing and the like and combinations thereof. Preferably, molding is carried out using ultraviolet light or using the full spectrum of visible light. Many shape memory polymers are transparent to ultraviolet or visible light making them particularly well suited for use as ophthalmic molds.

More specifically, the conditions suitable for curing the lens-forming material will depend on the material selected and the lens to be formed. For formation of spectacle lenses, a preferred curing condition is a two-stage UV cure in which the mold assembly is exposed to low intensity and then high intensity ultraviolet light. Low intensity UV light is UV light with an intensity of about 0.5 to about 50, preferably about 1 to about 5 mW/cm$^2$. High intensity UV light is of an intensity of about 50 to about 2000, preferably 500 to about 1500 mW/cm$^2$. The wavelengths at which the exposures are carried out may be, and preferably are, the same. Suitable wavelengths are about 300 to about 450, preferably about 360 to about 400 nm. The time for the low intensity exposure will depend on the lens-material selected, the type and amount of any initiator used, material viscosity and the nature of its reactive groups, and the intensity of the UV light. Subsequent to the termination of the low intensity exposure, the mold assembly is exposed to high intensity UV light under conditions suitable to complete through-cure of the lens-forming. The same factors determinative for low intensity exposure time are determinative for the high intensity exposure time. Both high and low intensity exposure may, and preferably are, carried out as single, continuous exposures. However, the exposures also may be carried out using alternating periods of UV exposure and non-exposure periods. The low and high intensity polymerization steps may be carried out at a temperature between about 10 to about 50° C. and atmospheric pressure, preferably at ambient temperature. The UV exposure may be used alone or in combination with heat.

Polymerization processes for contact lenses are well known. Suitable processes are disclosed in U.S. Pat. No. 5,540,410 incorporated herein in its entirety by reference. For formation of contact lenses, a preferred curing condition is to pre-cure the mold assembly using UV light with an intensity of about 2 to about 10 mW/cm$^2$. Following the pre-cure, the mold assembly is exposed to UV light of an intensity of about 0 to about 4.0 mW/cm$^2$. Suitable wavelengths are about 300 to about 500 nm. The time for the low intensity exposure will depend on the lens-material selected, the type and amount of any initiator used, material viscosity and the nature of its reactive groups, and the intensity of the UV light. Both pre-cure and subsequent UV exposure may, and preferably are, carried out as single, continuous exposures. However, the exposures also may be carried out using alternating periods of UV exposure and non-exposure periods. The polymerization steps preferably is carried out at a temperature between about 40 to about 75° C. and atmospheric pressure preferably under a blanket of nitrogen gas. Total cure time is between about 300 to about 500 seconds. Once the curing is completed and the formed lens is removed from the mold. Depending on the lens material, the lens may go through further processing prior to use. Additional process steps, such as hydration, inspection, and packaging have been disclosed in the prior art.

The mold comprising the SMP or SMA may be re-used after it is used to form an ophthalmic product. The SMP or SMA is just heated above it glass transition temperature and preferably returned to its preform shape, either flattened into a sheet and cooled or compressed in a compression fixture to return it to its non-deformed mold shape and cooled. The SMP or SMA preform sheet can be used again in any of the methods of making the mold described herein. The SMP and SMA molds can alternatively be re-shaped without returning them to their preform shape. With care the SMP and SMA molds can be used to form multiple lenses, although preferably they are used once and then returned to their preform shape.

The adjustment means may be manipulated so that the agile tool returns to its first shape or assumes another shape for use in forming a mold of another prescription. Alternatively, in the case that the molding surface of an agile tool is an SMP or an SMA, all or a portion of the molding surface first may be deformed by the adjustment means, heated to above the molding surface material's Tg, subsequently cooled, and then it can be re-used to form another mold.

Figure 15:
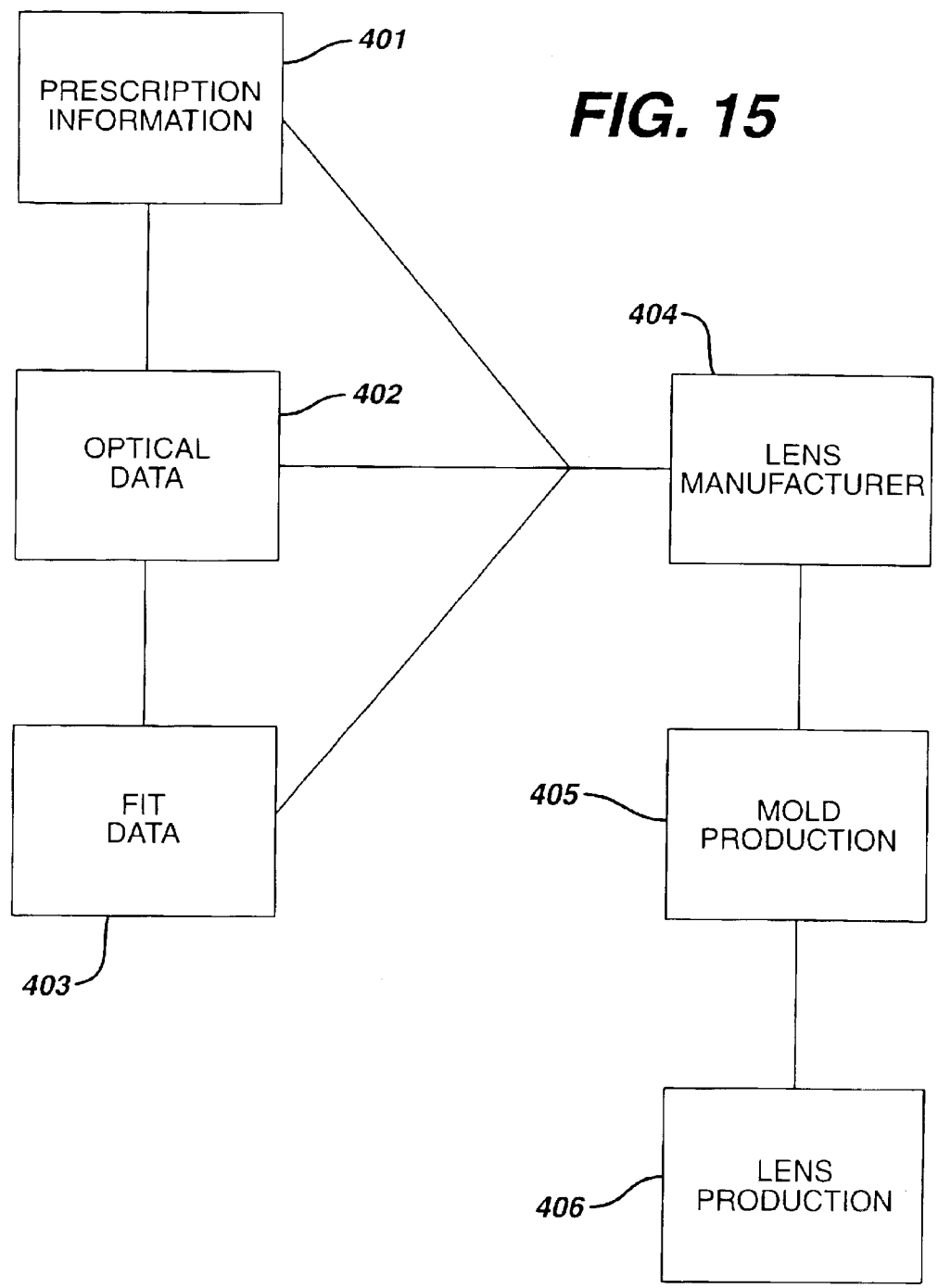
FIG. 15 is a flow diagram of a process for making and using the mold of the invention.

In one embodiment of this invention, the mold of the invention may be used to provide any ophthalmic lenses suitable to correct visual acuity defects. However, the molds of the invention may find particular utility in providing lenses that are formed using an agile tool that can be customized to correct the aberrations, both low and high order, of a specific lens wearer. FIG. 15 is a flow diagram of a method for providing such lenses using the molds of the invention.

In step 401 of the method, a lens wearer's prescription information is determined. By "prescription information" is meant information necessary to correct the low order aberrations of the lens wearer. This information includes, without limitation, sphere, cylinder, axis, add power, and the like, and combinations thereof. The information may be obtained using conventional ocular measuring devices or, and preferably, by use of wavefront sensors. Optionally and preferably, in step 402, optical data is determined for the lens wearer. "Optical data" means measurement of higher order ocular aberrations. Such data is obtained using wavefront sensors. Finally, optionally and preferably, patient fit data is determined in step 403. For contact lenses, such data will include, without limitation, corneal topographic measurements of the lens wearer's cornea. For spectacle lenses, such information will include, without limitation, fitting height, distance zone pupillary distance, and the like, and combinations thereof.

The prescription information, optical data, and patient fit data (collectively, the "order information") is then sent to the lens manufacturer (404) by any convenient ordering means including, without limitation, telephone, facsimile transmission, internet website, and the like and combinations thereof. In a preferred embodiment, ordering is carried out via the lens manufacturer's internet website by the customer using any means capable of communicating with the lens manufacturer's server system (web server or web site). Suitable means for communicating with the website include, without limitation, a personal computer and modem. Thus, in yet another embodiment the invention provides a method for producing customized ophthalmic lenses comprising, consisting essentially of, and consisting of the steps of: a.) transmitting, by a customer using a computer system, to a lens manufacturer's server system lens order information; b.) manufacturing by the lens manufacturer at least one mold member using an agile tool comprising, adjustment means for deforming a molding surface (405); and c.) forming a lens using said mold member (406).

In carrying out manufacturing of the lenses, the lens manufacture uses the order information, in whole or in part, to drive the adjustment means of the agile tool to manufacture a mold member and using the mold member preferably in combination with another mold member to manufacture the wearer's lens. By "customer" is meant an orderer of spectacle lenses, contact lenses, interocular lenses or the like. Examples of lens orderers include, without limitation, ophthalmologists, optometrists, opticians, lens retailers, lens wearers, and the like. Preferably, the method of the invention is carried out so that it is a business-to-business system.

One or more mold members used to form ophthalmic lenses may comprise the shape memory polymers or shape memory alloys. Alternatively, one mold member formed using the shape memory polymers or shape memory alloys of this invention may be paired with a second mold member that has been formed using conventional methods and materials, e.g. by injection molding a thermoplastic material as disclosed and described in U.S. Ser. No. 09/305,886 filed May 5, 1999, and U.S. Pat. No. 5,545,366 which are both incorporated herein by reference, or by the use of a reusable mold formed out of quartz or glass. In one embodiment, the mold member comprising the shape memory polymers or shape memory alloys, preferably a second mold member may be formed using an agile tool that adjusts its molding surface to account for the lens wearer's cornea's surface information. The first mold member (to be paired with the second mold member that comprises the SMP or SMA) may provide for a common power correction i.e. to correct for defocus errors, that can be provided either with a reusable mold member, or a mold member that can be readily injection molded. Therefore, the mold of this invention may comprise a mold member comprising SMP or SMA, and another mold member that does not comprise SMP or SMA. The mold member that does not comprise SMP or SMA may be a reusable mold member or a disposable mold member.

The following examples are provided to illustrate the scope of the present invention. Because these examples are given for illustrative purposes only, the invention should not be deemed limited thereto. The first two examples describe the process of making the preferred shape memory polymers.

EXAMPLE 1

A polymeric reaction mixture was formulated by mixing vinyl neodecanoate (7%), divinyl benzene (1%), and styrene (90%) in random order to yield a clear solution. Benzoyl peroxide (2%) was then added to the resulting solution (all composition % are by weight). The resulting solution was kept cold in a refrigerator before use. To prepare the shape memory polymer (SMP), the reaction mixture formulated above was injected by syringe into a mold fabricated with two 14" by 14" glass plates separated by Viton spacer. The two sheets of glass were held together by clamps around the edges. The Viton spacer also acts as sealant in the mold. The sample was then heated in an oven maintained at atmospheric pressure and a temperature of 75° C. for 24 hours. After the sample was cured for the specified period of time, it was removed from the oven and immediately transferred to a warm water bath. The temperature of water used was about 60° C. The SMP sheet formed was demolded under the warm water by applying a slight prying force at the edges of the mold. The released SMP sheet was then allowed to dry and cool down to room temperature.

At the conclusion of this polymerization process a clear preform sheet of a cured shape memory polymer was obtained.

EXAMPLE 2

A polymeric reaction mixture was formulated by mixing vinyl neodecanoate (7%), divinyl benzene (1%), and styrene (60%) in random order to form a colorless solution. Polystyrene granules (30%) were then added to the resulting solution. The resulting mixture was then allowed to sit at room temperature with occasional stirring until all the polystyrene granules were dissolved to give a clear, viscous solution. Benzoyl peroxide (2%) was then added to the resulting solution (all composition % are by weight). The resulting mixture was ultrasonicated at room temperature for 15 minutes to yield a clear solution. The resulting solution was kept cold in a refrigerator before use. To prepare the shape memory polymer (SMP), the reaction mixture formulated above was injected by syringe into a mold fabricated with two 14" by 14" glass plates separated by Viton spacer. The two sheets of glass were held together by clamps around the edges. The Viton spacer also acts as sealant in the mold. The sample was then heated at 75° C. at atmospheric pressure for 24 hours. After the sample was cured for the specified period of time, it was removed from the oven and immediately transferred to a warm water bath. The temperature of water used was about 60° C. The SMP sheet formed was demolded under the warm water by applying a slight prying force at the edges of the mold. The released SMP sheet was then allowed to dry and cool down to room temperature.

At the conclusion of this polymerization process a clear preform sheet of a cured shape memory polymer was obtained.

The following examples, Examples 3 and 4 describe a process of making a mold member comprising an SMP using a press.

EXAMPLE 3

A sheet of polynorbornene SMP having a wide thickness variation of between 0.65 mm and 0.85 mm was cut into discs that were accommodated in a holding device of the type illustrated in the drawings. The SMP disc, disposed in the holding device, was placed in an alignment jig of the type depicted in the drawings and disposed between a base curve element and a core element of the type shown in the drawings.

The thus formed assembly was disposed on a hot plate and a 25 lb weight was placed atop the core element. The SMP sample was heated to a temperature slightly in excess of its glass transition temperature and then the pressure was applied. It is emphasized that this temperature was in excess of the curing temperature of the SMP polynorborene The SMP disc, pressed between the core and base curve elements, was formed into the shape of the base curve element. Thereupon, the 25 lb weight and the hot plate were removed and the apparatus was cooled to ambient temperature and the thus formed front curve lens mold was removed.

The aforementioned contact lens mold member forming process was repeated four times to produce five mold members. The thus formed contact lens mold members were analyzed to determine their curvature characteristics and their surface roughness. This was accomplished by measuring curvature, i.e. radius, in millimeters, and its deviation from form, as measured as "PV." This value, when multiplied by 633 nanometers, yields the degree of deviation, in nanometers, of the mold part. These measurements were made with a Mark IV GPI XP® interferometer. Surface smoothness, as measured by root mean square roughness, in microns, was also measured by an interferometer, albeit a different type of interferometer, a New View 3D Surface® interferometer.

In addition to these tests, the brass insert into which the SMP molds were disposed was measured for radius and PV values. Obviously, these values are the same for all five molds since the SMP molds are formed of a single base curve element designed for a specific metal insert.

The results of these tests and measurements are summarized in Table 1.

TABLE 1

| | Forming Metal Insert | | SMP Mold | | |
|---|---|---|---|---|---|
| Mold No | Radius, mm | PV | Rad, mm | PV | RMS, microns |
| 1 | 7.430 | 0.246 | Could not be measured | | 0.379 |
| 2 | 7.430 | 0.246 | 7.407 | .0322 | .0.034 |
| 3 | 7.430 | 0.246 | 7.403 | 5.678 | 0.062 |
| 4 | 7.430 | 0.246 | 7.388 | 5.580 | 0.106 |
| 5 | 7.430 | 0.246 | 7.396 | 2.628 | 0.144 |

EXAMPLE 4

Another example, in accordance with that described in Example 3, was conducted in which four female SMP contact lens mold halves were formed of the same sheet of polynorbornene used in Example 1. However, the four molds were fabricated using four different base curve elements. Thus each mold was formed from a different press assembly.

The measured results reported for this example were identical to the results reported in Example 3 with the exception that the surface roughness of the metal inserts was also reported, using the same instruments used in Example 3. However, two additional comparisons were included in this example. The first additional comparison was a measurement of the surface roughness of the SMP sheet from which the SMP molds were formed. This measurement was made in accordance with the procedure utilized in the determination of the surface roughness of the SMP molds and metal inserts. The second additional comparison was another surface roughness measurement. However, this measurement compared the surface roughness of a contact lens mold half prepared in accordance with the prior art procedure of utilizing a non-SMP, e.g. polystyrene, sheet as the contact lens mold material of construction.

The results of this example are summarized in Table 2.

TABLE 2

| | Forming Metal Insert | | | Formed Plastic Mold or Sheet | | |
|---|---|---|---|---|---|---|
| Sample | Rad., mm | PV | RMS, microns | Rad., mm | PV | RMS, micr. |
| Flat SMP Sheet | | | | | | .544 |
| 1st SMP Mold | 7.429 | .263 | .025 | 7.424 | 2.207 | .077 |
| 2nd SMP Mold | 7.429 | .261 | .021 | Could not be measured | | .438 |
| 3rd SMP Mold | 7.431 | .137 | .024 | 7.412 | 3.371 | .056 |
| 4th SMP Mold | 7.429 | .186 | .028 | 7.427 | 1.672 | .035 |
| Polystyrene Mold | | | | | | .031 |

The above embodiment and examples are provided to illustrate the scope and spirit of the present invention. These embodiments and examples will make apparent, to those skilled in the art, other embodiments and examples. Those other embodiments and examples are within the contemplation of the present invention. Therefore, the present invention should be limited only by the appended claims.

What is claimed is:

1. An ophthalmic mold comprising a shape memory polymer that is a copolymer of styrene and a vinyl compound.

2. A mold in accordance with claim 1 comprising a first member and a second member.

3. A mold in accordance with claim 2 wherein said mold is prepared in a press and said second member of said mold is formed in a shape of a base curve element and said first member is formed in the shape of a front curve element.

4. A mold in accordance with claim 3 wherein said press includes a core element which interacts with said base curve element and said front curve element.

5. A mold in accordance with claim 4 wherein said base curve element and said front curve element are formed of a metal and wherein said base curve and said front curve elements have an optical fanning surface whose root mean square surface roughness is no more than about 20 nanometers.

6. A mold in accordance with claim 4 wherein said core element is provided by gas pressure.

7. A mold in accordance with claim 1 wherein a mold half of said shape memory polymer mold is prepared in a press by the steps which comprise:
   a) placing a preform of a shape memory polymer between a front curve or a base curve element and a core element;
   b) heating said preform to a temperature at or above the glass transition temperature but below the decomposition temperature but below the decomposition temperature of said shape memory polymer;
   c) providing a pressure sufficient to cause said shape memory polymer sheet to assume a shape of said front curve or base curve element;
   d) reducing the temperature of said formed shape memory polymer to below said glass transition temperature; and
   e) removing said formed shape memory polymer from said coining press.

8. A mold in accordance with claim 7 wherein said temperature in said step (d) is reduced to ambient.

9. A mold in accordance with claim 7 wherein said preform is a sheet of said shape memory polymer is disposed in a holder prior to said step (a) and said formed shape memory polymer is removed from said holder subsequent to said step (e).

10. A mold in accordance with claim 1 further comprising one or more mold members wherein at least one mold member is prepared in an agile tool, comprising adjustment means that are used to shape said mold member.

11. A mold in accordance with claim 10 wherein said adjustment means is a plurality or an array of concentric tubes and said agile tool further comprises a deformable molding surface.

12. A mold in accordance with claim 10 wherein said adjustment means is a plurality or an array of pins.

13. A mold in accordance with claim 10 wherein said adjustment means is an array of heaters.

14. A mold in accordance with claim 10 wherein said shape memory polymer halves are prepared in said agile tool by the steps which comprise:
   a) contacting a sheet of a shape memory polymer between deformable molding surface, whose shape is defined by adjustment means, and a core element under a pressure sufficient to cause said shape memory polymer sheet to assume a shape of said front curve or base curve actuated surface at a temperature at or above the glass transition temperature but below the decomposition temperature of said shape memory polymer;
   b) reducing the temperature of said formed shape memory polymer to below said glass transition temperature;
   c) moving said core element out of contact with said sheet of said shape memory polymer; and
   d) removing a contact lens mold half formed shape memory polymer from said agile tool.

15. A mold in accordance with claim 14 wherein said sheet of said shape memory polymer is disposed in a holder prior to said step (a) and said formed shape memory polymer is removed from said holder subsequent to said step (d).

16. A mold in accordance with claim 2 wherein at least one surface of at least one mold member is formed by gas pressure that presses the surface opposite said one surface against a surface of a press or agile tool.

17. A mold in accordance with claim 16 wherein said surface of said agile tool is formed by a plurality of concentric tubes.

18. A mold in accordance with claim 1 wherein said mold is prepared by the steps which comprise:
   a) disposing a sheet of a shape memory polymer upon an adjustment means, set to define a predetermined shape, said adjustment means being in a desired shape;
   b) elevating the temperature of said sheet of said shape memory polymer to at least the glass transition temperature but below the decomposition temperature;
   c) emitting a stream of gas at said sheet of said shape memory polymer at a pressure sufficient to cause a sheet of said shape memory polymer to form shape of said actuator means;
   d) reducing the temperature of said formed shape memory polymer to below said glass transition temperature
   e) removing said formed shape memory polymer from atop said adjustment means.

19. A mold in accordance with claim 18 wherein said reducing of temperature in step (d) is reduced to ambient.

20. A mold in accordance with claim 18 including the step of creating a vacuum concurrent with step (c).

21. A mold in accordance with claim 1 that further comprises intrinsic actuators.

22. A mold in accordance with claim 21, wherein said mold is prepared by the steps which comprise;
   a) compressing a preform with projections on one surface of said preform;
   b) actuating selected intrinsic actuators by heating said individual intrinsic actuators above the Tg of said intrinsic actuators; and
   c) cooling said intrinsic members.

23. The mold of claim 1, wherein the vinyl compound is a compound other than styrene.

24. The mold of claim 23, wherein the mold further comprises a multifunctional crosslinking agent.

25. The mold of claim 24, wherein the mold further comprises a modifying polymer.

26. The mold of claim 1, wherein vinyl said compound vinyl neodecanoate, vinyl benzoate, vinyl propionate, vinyl stearate, a methylstyrene, 4-(vinyloxy)butyl stearate or a vinyl pyridine.

27. The mold of claim 25, wherein said vinyl compound is vinyl neodecanoate, vinyl benzoate, vinyl propionate, vinyl stearate, a methylstyrene, 4-(vinyloxy)butyl stearate or a vinyl pyridine.

28. The mold of claim 24, wherein the crosslinking agent is difunctional.

29. The mold claim 28, wherein the crosslinking agent is divinyl benzene, bis(4(vinyloxy)butyl)terephthalate or bis(4-(vinyloxy)methyl)cyclohexyl)methyl terephthalate.

30. The mold of claim 25, wherein said modifying polymer is a thermoplastic polymer compatible with said polymer formed by the reaction product of said styrene andsaid vinyl compound.

31. The mold of claim 28, wherein said vinyl compound a vinyl neodecanoate and said difunctional crosslinking agent is divinyl benzene.

32. An ophthalmic mold comprising a shape memory polymer reaction mixture comprising about 30 to about 95 percent styrene, about 5 to about 60 percent vinyl compound, about 0.5 to about 5 percent of a difunctional crosslinking agent, wherein said percentages being about weight based on the total weight of the mixture.

* * * * *